(12) United States Patent
Kane et al.

(10) Patent No.: US 8,025,800 B2
(45) Date of Patent: *Sep. 27, 2011

(54) ELEMENT REMOVAL APPARATUS

(75) Inventors: Terrence P. Kane, Glen Ellyn, IL (US);
Raymond Joseph Lovett, Morgantown, WV (US)

(73) Assignee: Global Material Technologies, Inc., Buffalo Grove, IL (US)

( * ) Notice: Subject to any disclaimer, the term of this patent is extended or adjusted under 35 U.S.C. 154(b) by 621 days.

This patent is subject to a terminal disclaimer.

(21) Appl. No.: 12/058,609

(22) Filed: Mar. 28, 2008

(65) Prior Publication Data

US 2009/0242489 A1    Oct. 1, 2009

(51) Int. Cl.
*C02F 1/58* (2006.01)
*C02F 1/70* (2006.01)

(52) U.S. Cl. ........ 210/205; 210/203; 210/209; 210/238; 210/484; 210/502.1; 210/505; 210/510.1

(58) Field of Classification Search ................. 210/198.1
See application file for complete search history.

(56) References Cited

U.S. PATENT DOCUMENTS

| | | | | |
|---|---|---|---|---|
| 3,043,432 A * | 7/1962 | Megesi | ............................ | 210/99 |
| 3,819,515 A * | 6/1974 | Allen | ............................ | 210/695 |
| 4,268,392 A * | 5/1981 | Hayes | ............................ | 210/238 |
| 4,416,674 A * | 11/1983 | McMahon et al. | ............... | 55/485 |
| 4,806,264 A | 2/1989 | Murphy | ......................... | 210/695 |
| 5,004,212 A * | 4/1991 | Gutierrez | ...................... | 266/170 |
| 5,298,170 A * | 3/1994 | Woog | ............................ | 210/719 |
| 5,358,638 A * | 10/1994 | Gershenson | .................. | 210/448 |
| 5,472,176 A * | 12/1995 | Azzara | .......................... | 266/170 |
| 5,494,582 A | 2/1996 | Goodman | ...................... | 210/631 |
| 5,510,040 A | 4/1996 | Miller et al. | ................... | 210/721 |
| 5,972,814 A | 10/1999 | Schild, III et al. | ............ | 442/377 |
| 6,096,222 A * | 8/2000 | Wurzburger et al. | ......... | 210/713 |
| 6,183,644 B1 | 2/2001 | Adams et al. | ................. | 210/611 |
| 6,249,941 B1 | 6/2001 | Krupnik et al. | ................ | 29/4.51 |
| 6,602,421 B2 | 8/2003 | Smith | ........................... | 210/662 |
| 6,942,807 B1 * | 9/2005 | Meng et al. | .................... | 210/719 |
| 7,156,987 B1 * | 1/2007 | Sanguinetti | ................... | 210/164 |
| 7,314,500 B1 * | 1/2008 | Senff | .............................. | 75/713 |
| 2005/0082233 A1 | 4/2005 | Ludwig et al. | ................ | 210/747 |
| 2007/0181511 A1 | 8/2007 | Smith et al. | ................... | 210/792 |
| 2007/0278159 A1 | 12/2007 | Ghosh et al. | .................. | 210/749 |

OTHER PUBLICATIONS

"Information and Price Sheet", GMT Steel Wool Reels and Hand Pads, Global Material Technologies, Inc., (Nov. 2006).

* cited by examiner

*Primary Examiner* — Peter A Hruskoci
(74) *Attorney, Agent, or Firm* — J. Peter Paredes; Rosenbaum & Silvert, P.C.

(57) ABSTRACT

A process and apparatus for removing elements is described herein.

20 Claims, 15 Drawing Sheets

ELEMENT REMOVAL APPARATUS

BACKGROUND OF THE INVENTION

The field of the invention is a process and apparatus for the removal of elements from water, and more particularly the removal of contaminants, such as selenium.

Selenium is a naturally occurring metalloid element having atomic number 34 and an atomic weight of 78.96. Selenium is widely dispersed in igneous rock. Selenium also appears in large quantities, but in low concentrations, in sulfide and porphyry copper deposits. Moreover selenium is widely associated with various types of sedimentary rock. Inorganic selenium is most commonly found in four oxidation states ($Se^{6+}$, $Se^{4+}$, $Se^0$, and $Se^{2-}$). Selenate ($SeO_4^{2-}$, Se(VI)) and selenite ($SeO_3^{2-}$, Se(IV)) are highly water soluble. Elemental selenium ($Se^0$) is insoluble in water.

Selenium is a common water contaminant throughout the United States and the world and represents a major environmental problem. Human related selenium release originates from many sources including mining operations, mineral processing, abandoned mine sites, petroleum processing, and agricultural run-off. The principal sources of selenium in mining are copper and uranium bearing ores and sulfur deposits. Selenium is commonly found in these mining wastewaters in concentrations ranging from a few micrograms per liter up to more than 12 mg/L. In precious metals operations, waste and process water and heap leachate solutions may contain selenium at concentrations up to 30 mg/L. It has been observed that concentrations of selenate as low as 10 µg/L in water can cause death and birth deformities in waterfowl; therefore, the established regulatory limit is 5 µg/L. Most of these mining operations, including both metal and non-metal mining operations, will need inexpensive and effective selenium removal processes to meet discharge and closure requirements. Additionally, the selenium removal difficulties include the different dissolved species, no direct precipitation chemistries, difficulty of reducing selenate, and sulfate interference.

The present invention attempts to solve these problems, as well as others.

SUMMARY OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

A process and apparatus for removing elements is described herein.

BRIEF DESCRIPTION OF THE FIGURES

The foregoing summary, as well as the following detailed description of preferred embodiments of the invention, will be understood when read in conjunction with the appended drawings. For the purpose of illustrating the invention, there is shown in the drawings embodiments which are presently preferred. It should be understood, however, that the invention is not limited to the precise arrangements and configurations shown.

FIG. 7D is a perspective view of the porous bag layer.

DETAILED DESCRIPTION OF THE PREFERRED EMBODIMENTS

The apparatus and process can be understood more readily by reference to the following detailed description of the apparatus and process and the Examples included therein and to the Figures and their previous and following description. While particular reference is made to the removal of selenium, it is to be understood that the elemental removal process and apparatus may be applied to other elements, as described below.

Figure 1:
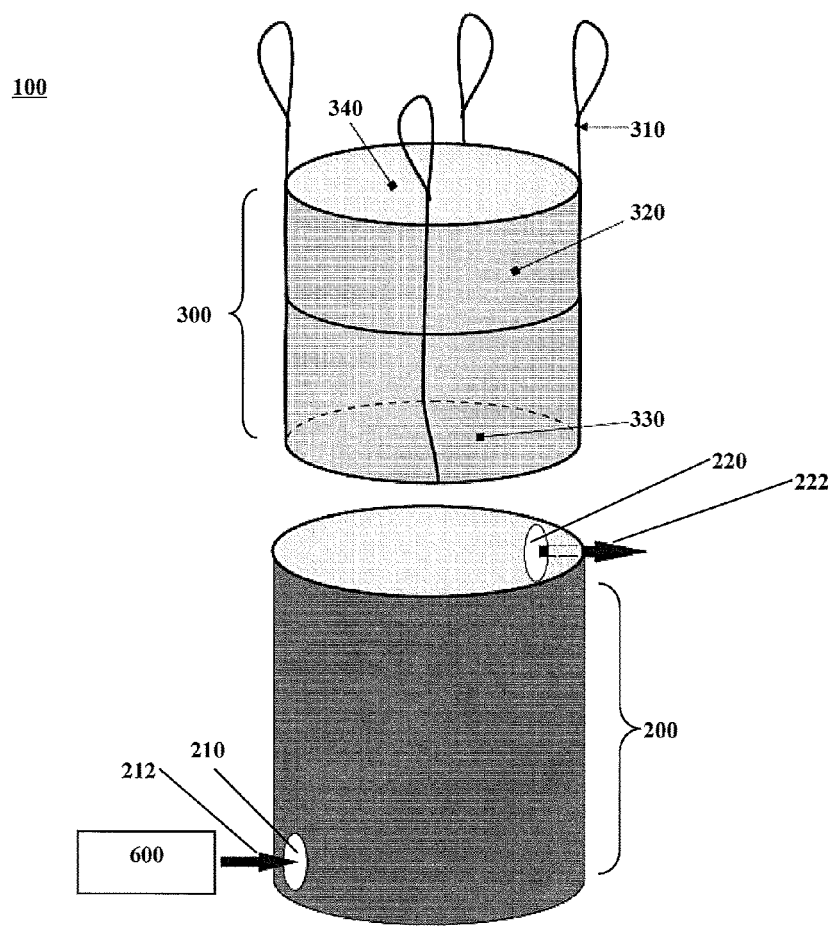
FIG. 1 is a schematic view of one embodiment of the invention.
Figure 2:
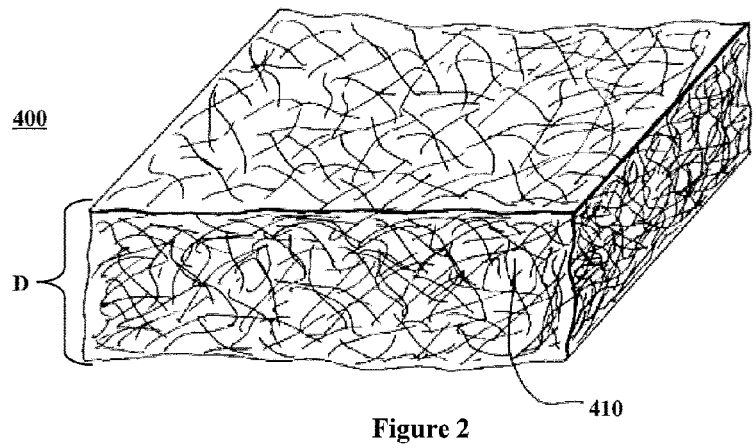
FIG. 2 is a perspective view of the Zero-Valent Iron Fiber ("ZVIF") Packing.

Generally speaking, one embodiment of the element removal process and apparatus is shown in FIG. 1. As shown in FIG. 1, a water treatment cell 100 comprises a container vessel 200, a porous bag 300, and a plurality of Zero Valent Iron Fiber ("ZVIF") packing 400. A cross-section of the ZVIF packing 400 is shown in FIG. 2, and comprises a plurality of metal fibers 410 with a density D. The metal fibers 410 comprise an average cross-sectional diameter d. The container vessel 200 includes an inlet port 210 and an outlet port 220. In one embodiment of the invention, the inlet port 210 may be located at the bottom of the container vessel 200 and the outlet port 220 may be located at the top of the container vessel 200 for bottom-in/top-out fluid flow. In another embodiment of the invention, the inlet port 210 may be located at the top of the container vessel 200, and the outlet port 220 may be located at the bottom of the container vessel 200 for top-in/bottom-out fluid flow. Fluid flow is demonstrated by arrows 212 and 222, whereby a water source containing elements requiring removal enters by way of 212 and exits the treatment cell 100 by way of 222. The porous bag 300 includes a plurality of lift straps 310, a porous bag wall material 320, a porous bottom 330, and a fill 340 of the ZVIF packing 400. The porous bag wall material 320 and the porous bottom 330 includes pores or a mesh cut pattern, such that the fill 340 of the ZVIF packing 400 is maintained and securely held within the porous bag 300 and the fluid flow is transmitted through the porous bag 300.

The fill 340 includes a controlled porosity and density D of the ZVIF packing 400 to treat a particular amount of fluid flow rate and allow for a particular contact time of the water of interest with the ZVIF packing 400. The fill 340 may be defined by the density D of the ZVIF packing 400 and the average diameter d of the metal fibers 410. In one embodiment of the invention, the fill 340 can range in densities from 1 lb/ft$^3$, 5 lb/ft$^3$, 10 lb/ft$^3$, 15 lb/ft$^3$, 20 lb/ft$^3$, 25 lb/ft$^3$, to 50 lb/ft$^3$. The fill 340 may include a variation of densities using the same diameter d of metal fiber from the bottom of the treatment cell 100 to the top of the treatment cell 100 by use of a plurality of porous bag layers 350, as shown in FIG. 7B. Alternatively, the fill 340 may include a plurality of porous bag layers 350 of the same density D of the ZVIF packing 400 with differing metal fiber diameters d ranging from the bottom of the treatment cell 100 to the top of the treatment cell 100. Alternatively, the fill 340 may include a plurality of porous bag layers 350 with differing densities D of the ZVIF packing, whereby each different porous bag layers 350 include differing metal fiber diameters d within each porous bag layer 350. Alternatively, the fill 340 includes a gradient of metal fibers with diameter d in the vertical direction indicated by the z-axis in FIG. 7B, or in the along either horizontal direction indicated by the x-axis and y-axis in FIG. 7B. In all, the density D of the ZVIF packing and the average diameter d of the metal fiber 410 define the total surface area available for selenium removal, further described below. Porosity is the free space in the ZVIF packing 400 in the fill 340 for fluid flow and relates to the maximum fluid flow rate and the volume %. The fluid flow must travel around the metal fibers 410, so the travel path of the fluid flow through the metal fibers 410 is tortuous and decreases the fluid flow rate. Volume % is the percentage of the total volume occupied by ZVIF packing 400 relative to the percentage of open space between the metal fibers 410. In one embodiment of the invention, the ZVIF packing 400 exceeding 2 volume % may have difficulty sustaining good fluid flow rates. 2 volume % of ZVIF packing 400 has 98% open space in the volume and 2% space occupied by the ZVIF packing 400. In one embodiment of the invention, the volume percentages of ZVIF packing may be 0.01 volume % to 0.09 volume %, 0.1 volume % to 1 volume %, 1.1 volume % to 1.9 volume %, and the like.

One or more pumps (not shown) may be utilized to facilitate flow through inlet port 210 or outlet port 220. Additionally, sieve filters (not shown) may be placed on the inlet port 210 or outlet port 220 to retain solid materials that may plug the medium at the inflow or remove solid reaction products at the outlet port 220. The solid material may include debris, scavenging material, and/or compost that may interact or clog the treatment cell 100. Valves may be located on the inlet port 210 and/or the outlet port 220 to control the flow rate of contaminated water into the treatment cell 100. A top-in/bottom-out fluid flow may include a pipe drain that rises up the side of the tank to below the inlet port 210, such that the container vessel 200 only drains after being filled with contaminated water. The inlet port 210 flow rate may be set to control the residence time. An oxygen trap 600 may be included to remove atmospheric oxygen before the contaminated water enters the treatment cell 100 and at the air/solid interface of the metal fiber 400. The oxygen trap 600 comprises of a replaceable iron cartridge or some commercially available device to reduce the amount of oxygen entering the inlet port 210 or at the air/metal fiber 410 interface.

In operation, contaminated water flows into the treatment cell 100 through inlet port 210, where the contaminated water flows through the porous bag wall material 320 and contaminants are removed through an interaction with the fill 340 of the ZVIF packing 400. The residence time is the time the contaminated water interacts with the ZVIF packing within the treatment cell 100. The residence time can be roughly determined by calculating the volume in gallons of ZVIF packing 400, and then determining the time it would take to displace that volume at a particular flow rate. The shortest residence times is determined by the permeability of the medium, or fill material 340. At some flow, water will not penetrate the medium efficiently and water will overflow the vessel 200 for top-in/bottom-out flow, or physically push the medium upward by water pressure for bottom-in/top-out fluid flow. The upper limit on the residence time depends on the lowest possible flow available to the vessel 200. In one embodiment of the invention, contaminated water containing selenium as selenite or selenate contacts the ZVIF packing 400 begins to remove selenium by reduction of selenate and selenite with Fe(0) (which is elemental or zero-valent iron "ZVI"), as shown by the following equations:

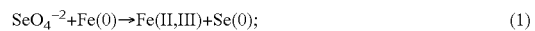
$$SeO_4^{-2}+Fe(0) \rightarrow Fe(II,III)+Se(0); \qquad (1)$$

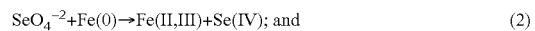
$$SeO_4^{-2}+Fe(0) \rightarrow Fe(II,III)+Se(IV); \text{ and} \qquad (2)$$

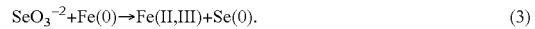
$$SeO_3^{-2}+Fe(0) \rightarrow Fe(II,III)+Se(0). \qquad (3)$$

Figure 3:
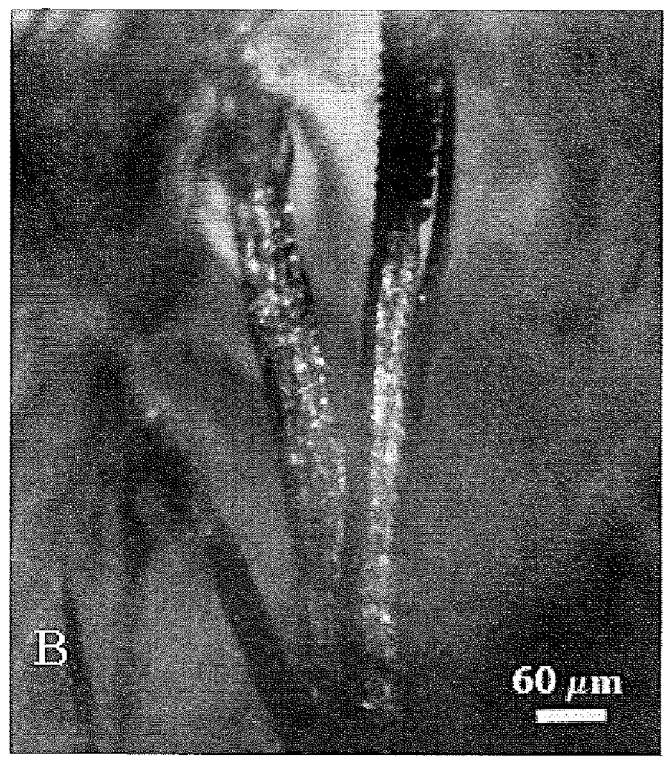
FIG. 3 is a light microscope image of view of the ZVIF packing after selenium removal.

When selenate and selenite react with ZVI Fe(0) oxidizes to Fe(II) or Fe(III) and insoluble Se(0) precipitates out of solution or adsorbs on the iron surface. If selenate is reduced to Se(IV) rather than Se(0), the resultant Se(IV) can adsorb to the iron fibers or is immobilized by Fe(III) oxides that are formed in the reaction. The synchrotron studies found Se(IV) adsorbed on the surface of the iron fiber. Iron serves as an electron source and as a substrate for Se(IV) adsorption. The ZVIF packing 400 reduces selenate to Se(IV) and Se(0) by a direct surface reaction. The reaction products are then immobilized by adherence at the ZVI reaction site or iron reaction products, as shown in FIG. 3. When the ZVIF packing 400 has completely reacted, the ZVIF packing 400 ceases to remove selenium and must be replaced. The ZVIF packing 400 may be removed from the treatment cell 100 by slowly lifting the lift straps 310 out of the container vessel 200, allowing the water to drain out into the container vessel 200, and removing the porous bag 300 from the container vessel 200. The removed ZVIF packing 400 is replaced with a new porous bag 300 with new ZVIF packing 400 for additional selenium removal. In one embodiment of the invention, a suitably designed system using the ZVIF packing 400 effectively removes selenium ions from the neutral or slightly alkaline mine water (pH 6-9) to a concentration below 5 μg/L. A neutral to alkaline pH avoids acid dissolution of iron, and in one embodiment of the invention, the pH may be adjusted to a range of pH 6 to a pH 9.

In one embodiment of the invention, other contaminants or low concentration substances in target waters may react with the ZVIF packing 400. For example, Fe(0) may react with one or more of chromium (as chromate), cobalt ions, arsenic (as arsenate or arsenite), cadmium (as $Cd^{+2}$), copper (as $Cu^{+2}$), cyanide, gold, lead, manganese (as permanganate), molybdenum (as molybdate), nickel, nitrate, selenium (as selenate or selenite), technetium (as $TCO^{-4}$), tin, uranium (as uranyl), vanadium (as vanadyl or other oxy species), radionuclides, pathogens (viruses, bacteria, protozoa), and/or halogenated organics such as chlorinated organics, and derivatives thereof. Fe(0) may also react with pesticides and herbicides, such that the pesticides and herbicides are adsorbed to the treatment system. As such, the treatment cell 100 serves as an effective clean-up system for mine water or other contaminated water sources to make contaminant removal more controllable.

Additionally, the Fe(II) produced by the reduction of selenium and dissolved oxygen is further oxidized to Fe(III), forming iron oxide and hydroxide minerals, as illustrated by the following equations:

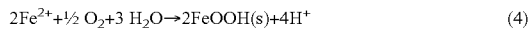

$$2Fe^{2+} + \tfrac{1}{2} O_2 + 3 H_2O \rightarrow 2FeOOH(s) + 4H^+ \quad (4)$$

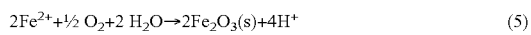

$$2Fe^{2+} + \tfrac{1}{2} O_2 + 2 H_2O \rightarrow 2Fe_2O_3(s) + 4H^+ \quad (5)$$

Equation (4) and (5) shows the formation of various oxyhydroxides of iron, which are colloquially known as "rust" that is associated with ZVI oxidation. The porous bag 300 contains most of the rust materials. In one embodiment, when the ZVIF packing 400 has reacted to exhaustion, the porous bag 300 will contain mostly rust and entrained selenium. Clogging is prevented by the formation of small oxyhydroxide particles and sufficient fluid flow to purge them. In one embodiment, ferrihydrite and goethite may be the first minerals formed.

Metal Fiber

Figure 4:
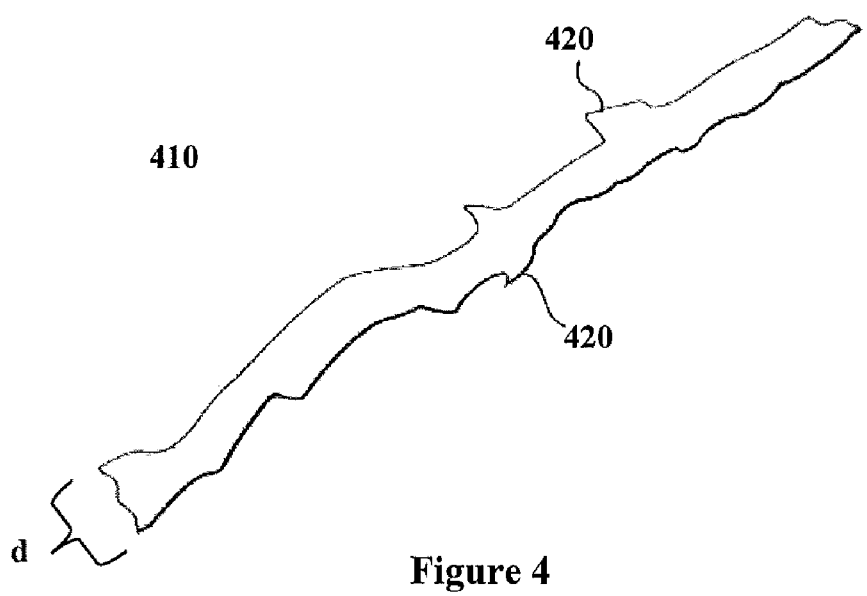
FIG. 4 is an enlarged perspective view of the metal fiber.

The ZVIF packing 400 include a plurality of metal fibers 410, as shown in FIG. 4. Generally speaking, the metal fibers 410 include an average cross-sectional diameter d, as shown in FIG. 4. The metal fibers 410 comprise an average cross-sectional diameter d ranging between about 10 and 125 microns. A superfine metal fiber includes an average cross-sectional diameter d of 25 microns. An extra fine metal fiber includes an average cross-sectional diameter d of 35 microns. A very fine metal fiber includes an average cross-sectional diameter d of 40 microns. A fine metal fiber includes an average cross-sectional diameter d of 50 microns. A medium metal fiber includes an average cross-sectional diameter d of 60 microns. A medium coarse metal fiber includes an average cross-sectional diameter d of 75 microns. A coarse metal fiber includes an average cross-sectional diameter d of 90 microns. An extra coarse metal fiber includes an average cross-sectional diameter d of 100 microns. In one embodiment, the selection of the average cross-sectional diameter d may be dependent on various factors including, but not limited to, concentrations of substances or contaminants of interest, the removal kinetics, and the flow characteristics of various fiber densities, and the like. Alternatively, the average cross-sectional diameter d may include an average fiber width between 10 to 1000 microns.

Figure 20:
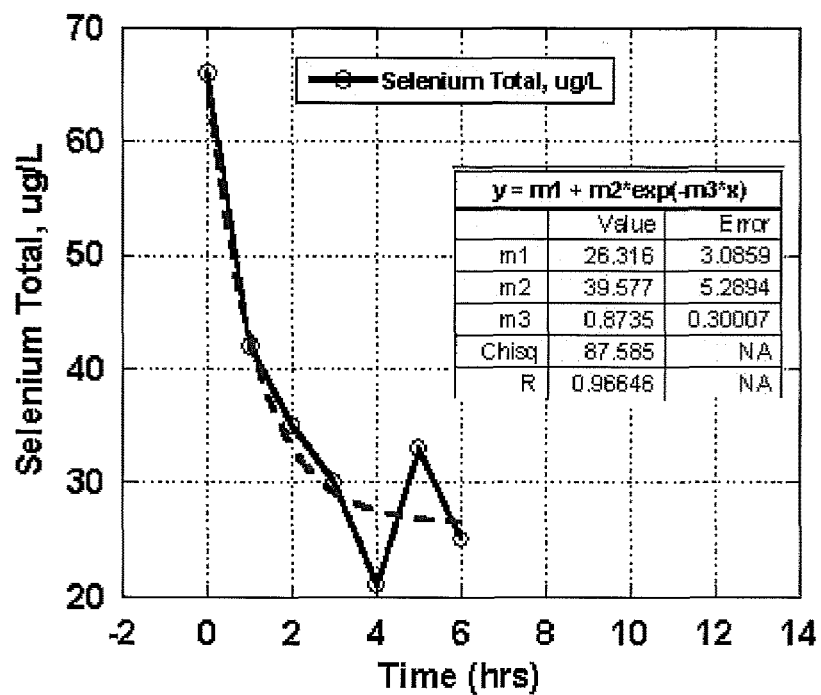
FIG. 20 is a plot of the initial Se removal portion fit to an exponential curve for 0-6 hours.
Figure 21:
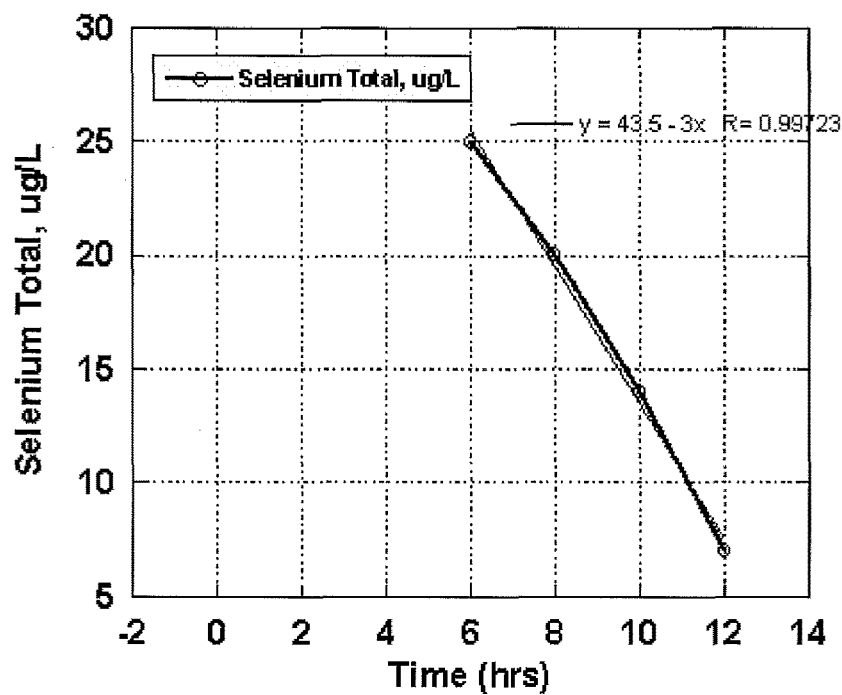
FIG. 21 is a plot of the selenium removal for 6-12 hours showing linear removal rates.

As shown in FIG. 4, in one embodiment of the invention, the ZVI fibers include an irregular cross-section and rough outer surfaces with projections 420 and fissures formed along the outer surfaces. The irregular cross-sections vary continuously along the length of the resulting fibers to provide generally asymmetrical metal fibers in the longitudinal and horizontal direction. The nature of the metal fibers provides increased surface area of the metal fiber for interaction with selenium ions. In one embodiment of the invention, the projections 420 are polycrystalline iron oxides. The increased surface area of the metal fibers increases the rate of reduction of selenium ions for the treatment system and allows for increased removal of selenium, i.e. providing a substrate for the reduction of soluble selenium species to insoluble Se(0) which is retained by surface adhesion or by the irregular cross sections. Selenate can also be reduced and deposited onto the metal fiber 410 surfaces as selenite. The surface area of the metal fibers 410 in the treatment cell 100 is one factor that determines the rate of selenium reduction. The rate of selenium reduction may be given, most generally, by the formula—$d[SeO_4^{-2}]/dt = k[SeO_4^{-2}]^n$. Where k is a rate constant and n is the reaction order. The increased surface area of the metal fiber 400 functionally increases k because the more reactive collisions with the surface area are possible. For a given surface area, the selenium removal has been shown to be first order (n=1) at short reaction times with indications of zero order rate for long reaction times and very low concentrations. Other ions, such as chromate, have first order removal kinetics as well. In one embodiment of the invention, high selenium concentrations and the number of collisions with the metal fiber 400 depends on hoe many selenate molecules are available for collision (first order). As the concentration of selenate falls, the number of collisions with the metal fiber 400 depends on finding fiber, which is zero order in selenate. As shown in FIG. 20, an exponential curve is fitted to the initial selenium removal for 0-6 hours and shows first order removal for the reaction rate. As shown in FIG. 21, selenium removal at later times of 6-12 hours and shows zero order removal for the reaction rate. And the greater fiber densities favor kinetics that is in the first order for selenate to lower selenate concentrations. In one embodiment of the invention, metal fiber densities from 0.5 volume % to 2 volume % remove selenium at favorable rates.

Figure 5:
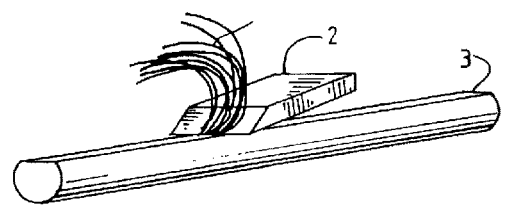
FIG. 5 is a schematic displaying the formation of the metal fiber.

As shown in FIG. 5, in one embodiment of the invention, the metal fibers 400 are produced by shaving a metal wire 1 with a metal member 2 with a succession of serrated blades, as disclosed in commonly assigned U.S. Pat. Nos. 5,972,814 and 6,249,941, which are hereby incorporated by reference. A suitable lubricant, such as oil, is preferably applied to the metal member 2 as it is being shaved by the blades in sufficient quantity so that the metal fibers retain on their outer surface a carding-effective amount of the oil or lubricant. "Carding-effective amount" of oil or lubricant means that the metal fibers, when blended with the nonmetal fibers, can be carded without substantial breakage or disintegration. The lubricant optionally may be applied after the metal fibers are formed. The carding-effective amount of oil generally may be in the range of about 0.3 to 1.0 wt. % oil, more preferably about 0.4 to 0.7 wt. %, based on the total weight of the metal fibers, although lesser or greater amounts may be used depending on the type and average diameter of the metal fibers. Preferably, the metal fibers are made from carbon steel, to result in Zero Valent Iron. However, the metal fibers 410 can also be made from other metals that result in Zero-Valent capabilities, such as copper, silver, palladium, nickel, tin, and the like. Alternatively, the metal fiber 410 may be bimetallic or an alloy of zero-valent metals, such as iron-nickel, iron-palladium, and the like.

Figure 6A:
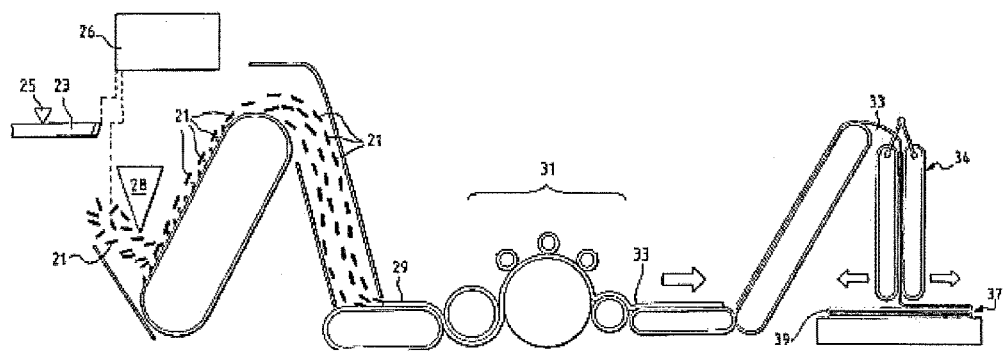
FIG. 6A is a schematic displaying the formation of the ZVIF packing.

Generally speaking, the metal fibers 400 are oriented as an isotropic mass in a randomized orientation after the metal fiber 400. The isotropic mass may be packed into the ZVIF packing 400 to form the fill 340. Alternatively, the metal fibers 400 are cut into staple lengths using a suitable metal fiber cutting apparatus 26 to give the metal fibers a predetermined length, as shown in FIG. 6A. After cut to the predetermined length, the metal fibers 400 may then be stacked to achieve a unit of isotropic mass. The cut fibers 21 are then fed into conventional textile apparatus which separates and blends the mass of fibers 21 in order to form a homogenous blend of fiber 29, as shown in FIG. 6A. The homogenous fiber mass 29 can then be carded in the garnett 31 to form a fiber web 33, which is readily understood by commonly assigned U.S. Pat. No. 6,249,941. The garnett 31 may be any suitable apparatus used in the textile field, with the spacing/number of the cylinders and the garnett wires depending on the size and strength of the metal fibers 21 being acted upon. The carding process generally imparts a slight "machine direction" to the fibers 21. Sufficient oil or other lubricant is retained on the fibers 21 of the homogenous fiber mass 29 when the web is processed by the garnett 31, to prevent undesirable fracturing or disintegration of the web 29. After carding by the garnett 31, the fiber web 33 is lapped by suitable textile apparatus 34 to form a multi-layer structure 37. The lapping apparatus 34 changes the orientation of the fiber web 33 as it is being deposited in successive layers. In this way, the orientation of adjacent ones of the layers 39 are rotated out of alignment from each other by a preselected angle, and the direction of the fibers 21 in the fiber web 33 varies between adjacent layers 39 of the resulting multi-layer structure 37 is interwoven may be used as the ZVIF packing 400.

Figure 6B:
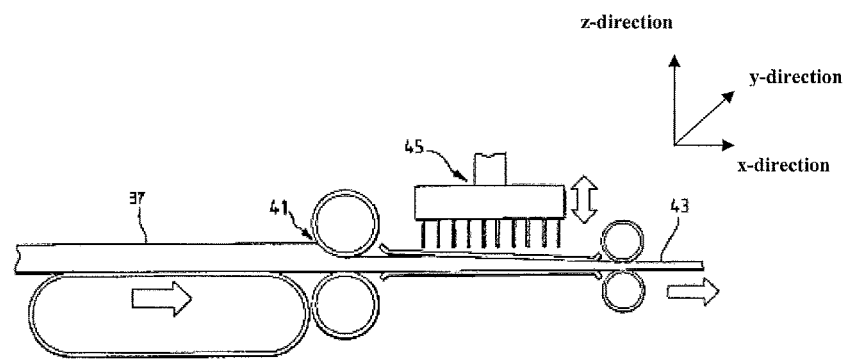
FIG. 6B is a schematic displaying the formation of the ZVIF packing.

In one embodiment of the invention, the multi-layer structure 37 is then fed through a suitable nip 41 and needled or needle-punched by textile apparatus 45, as shown in FIG. 6B. The needling of the multiple layers 39 interengages the fibers 21 of respective layers 39, giving the resulting ZVIF packing 43 improved strength, fiber density, and fiber distribution characteristics for selenium removal. The needling process causes the fibers 21 to be interengaged not only within respective layers 37 but also between the layers 37 (in the "z" direction relative to the layers). The x-direction is the longitudinal machine direction in which the fabric ply exits the textile apparatus. The y-direction is the transverse machine direction in which the fabric ply exits the textile apparatus. And the z-direction is the vertical direction in which the fabric ply exits the textile apparatus. The bias direction is any other direction 0-90 degrees between the x, y, or z-direction, and provides an interwoven and interengaged metal fiber 400 mass.

Figure 7A:
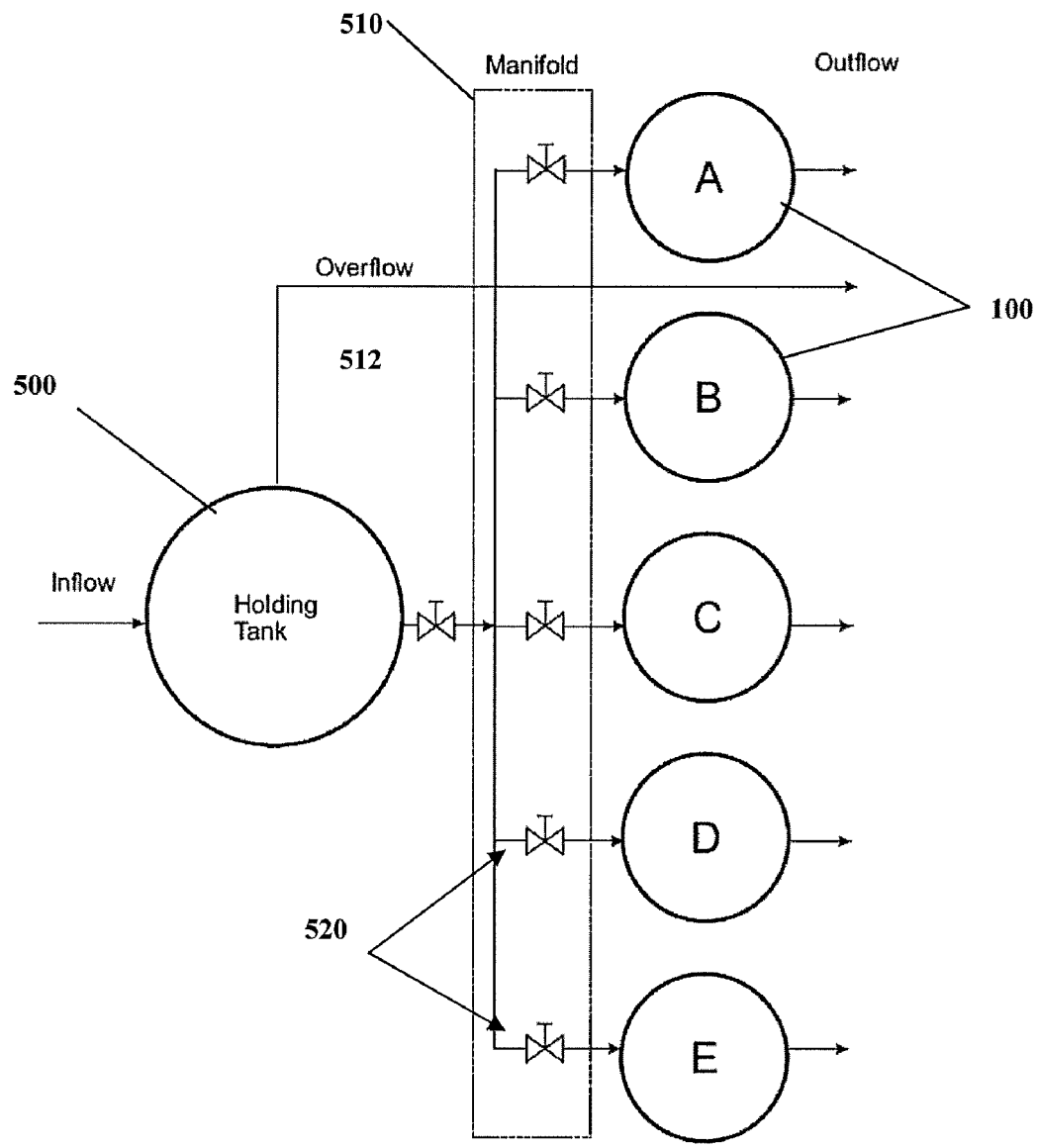
FIG. 7A is a top view of a schematic of one embodiment of the invention.
Figure 7B:
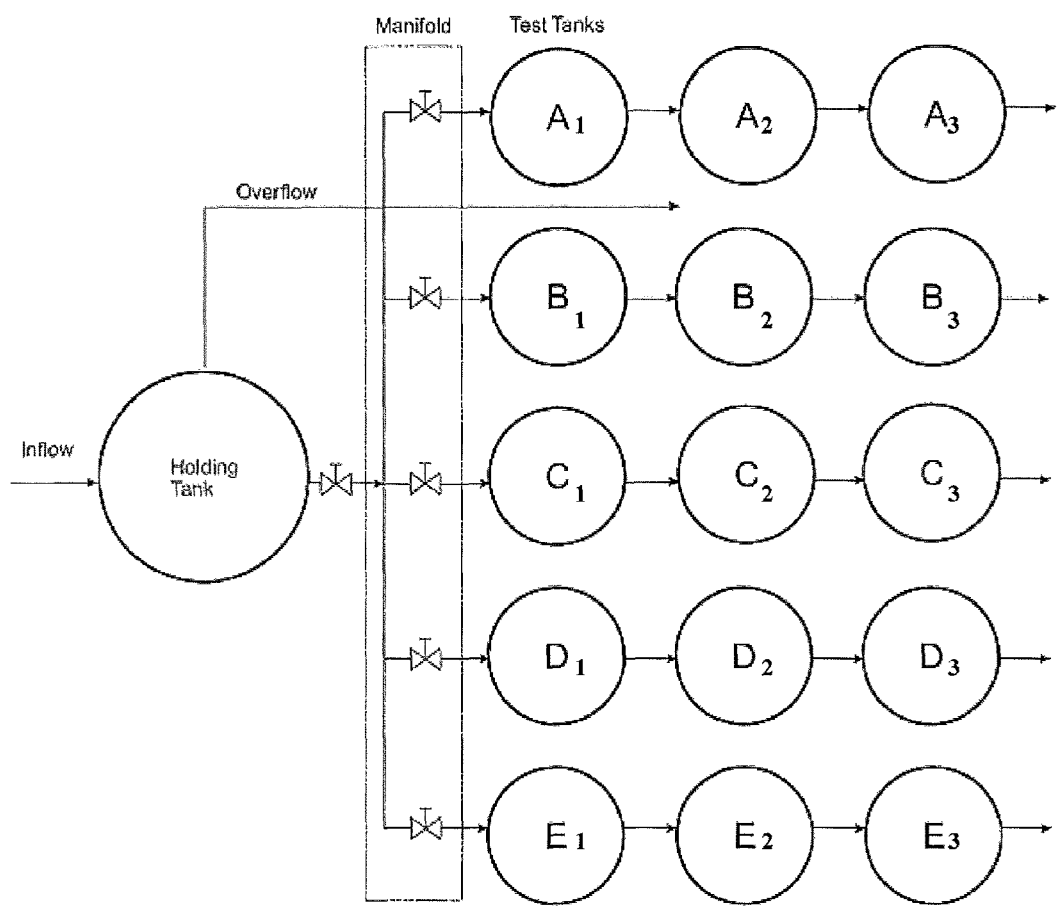
FIG. 7B is a top view of a schematic of another embodiment of the invention.

In one embodiment of the invention, the selenium removal process and apparatus includes a plurality of treatment cells 100 and a holding tank 500, as shown in FIG. 7A. The water of interest flows into the holding tank 500 through an inflow port and includes an overflow port. The holding tank 500 is fluidly connected to a manifold 510 by way of valve 512. The manifold 510 includes a plurality of valves 520, which fluidly communicate to a plurality of treatment cells 100. Generally speaking, the treatment cells 100 are described as previously indicated, and may include any number of treatment cells, which are designated as treatment cells A, B, C, D, and E in FIG. 7A. FIG. 7A displays the plurality of treatment cells 100 arranged in parallel. To treat larger systems and to handle a larger flow volume, after the parallel configuration of the plurality of treatment cells 100, sequential treatment cells 100 may be attached to the treatment cells A, B, C, D, and E, as shown in FIG. 7B. Such a distribution between 5 separate treatment cells into a series train may handle 100 gallon/minute fluid flows. For the series configuration, there can be any number of porous bag layers if required by the levels of selenium.

A parallel configuration of the treatment cells 100 distribute the flow to allow an adequate residence time in the treatment cells 100. Depending on the particular flow rate of the contaminated water, additional treatment cells 100 may be added or shut off by the valve system in the manifold. 510. Moreover, when the treatment cells 100 may be configured in a serial or sequential fashion, one treatment cell 100 is placed in fluid connection with another treatment cell 100, as to give a serial contamination removal processes for additional contaminant removal.

Figure 7C:
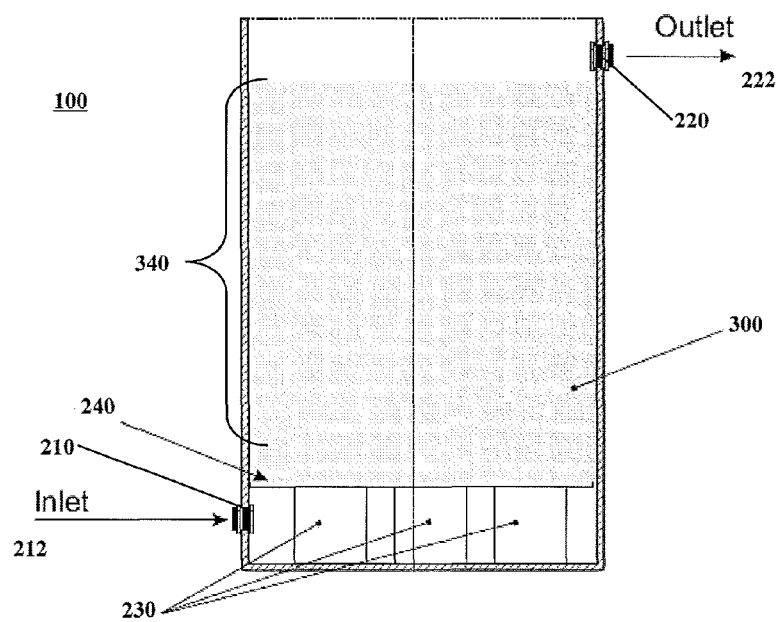
FIG. 7C a side view of one embodiment of the treatment cell.

A side view of one embodiment of the treatment cell 100 is shown in FIG. 7C. The inlet port 210 is located on the bottom of the container vessel 200 and fluid flow from the manifold is indicated by arrow 212. A plurality of spacers 230 are located on the bottom of the container vessel 200 to permit the water to flow into the bottom of the container vessel 200. A porous plate 240 separates the spacers 230 and the porous bag 300. The porous bag 300 includes the fill 340 of the ZVIF packing 400 to remove selenium. The treated water then flows out of outlet port 220 by way of fluid flow indicated by arrow 220, to either another treatment cell 100 or discharged consistent with the objectives of the treatment system.

Figure 7D:
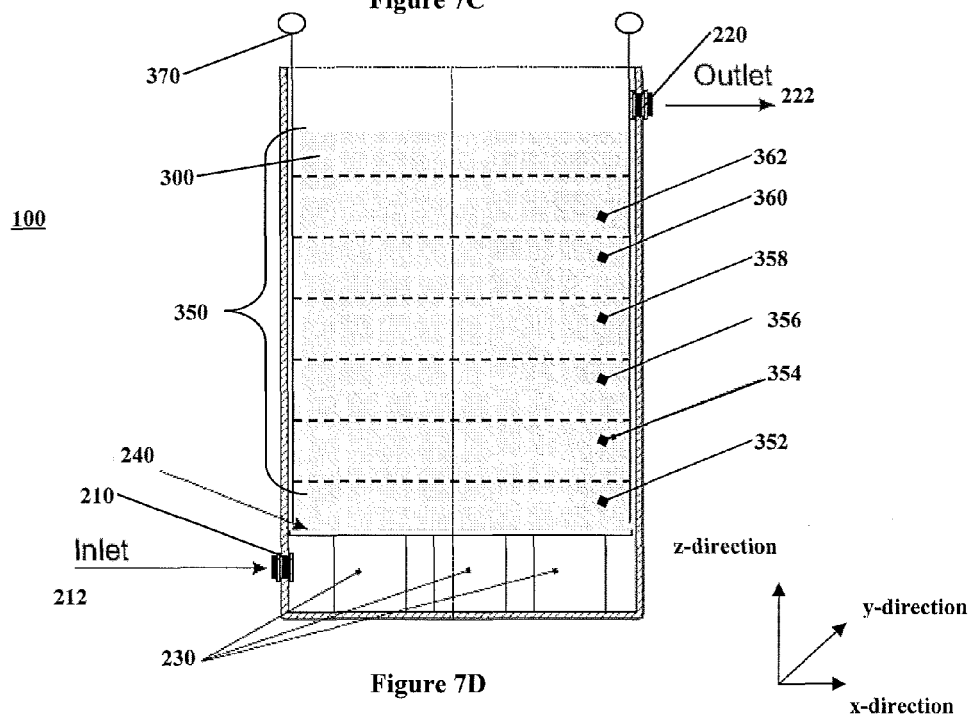
FIG. 7D is a side view of another embodiment of the treatment cell.

As shown in FIG. 7D, in one embodiment of the invention, the porous bag 300 may include a plurality of porous bag layers 350 of different densities of ZVIF packing 400. The porous bag layers 350 include a plurality of lift straps 370, a porous bag wall material, a porous bottom, and a fill of the ZVIF packing 400. The porous bag layers 350 are discrete and separate layers, where each porous bag layer may include a specific density of ZVIF packing 400. The plurality of porous bag layers may be implemented to accomplish different objectives, such as: (a) ease of maintenance and recharge by decreasing the weight of individual porous bag layers 350; (b) use of porous bag layers containing different densities of ZVIF packing 400 to accomplish more efficient target substance removal; (c) the use of inserts composed of differing average cross-sectional diameter d of the metal fiber 400 to accomplish more efficient target substance removal, and combinations of (b) and (c) to accomplish more efficient target substance removal. The porous bottom on one porous bag layer 350 separates the porous bag layer 350 from each one another. The porous bag layers 350 may include layers 352, 354, 356, 358, 360, and 362, wherein each layer may include different densities of ZVIF packing 400, including, but not limited to, 1 pound cubic foot, 5 lb/ft$^3$, 10 lb/ft$^3$, 15 lb/ft$^3$, 20 lb/ft$^3$, 25 b/ft$^3$, to 50 lb/ft$^3$. For example, the bottom layer 352 may include a density of 5 lb/ft$^3$ as to prevent clogging of the bottom layer 352. The middle layers 354, 358, 360, and 362 may have an increased density of 20 lb/ft$^3$, to permit increased selenium removal once the contaminated water is within the treatment cell 100. And the top layer 364 may include a density of 5 lb/ft$^3$. In one embodiment of the invention, the porous bag layers 350 include metal fibers of any cross-section diameter d at any density. The porous bag layer 350 can be of any thickness and weight, and the stacking of the porous bag layers 350 may be dictated by the system requirements, removal, and the like.

Figure 7E:
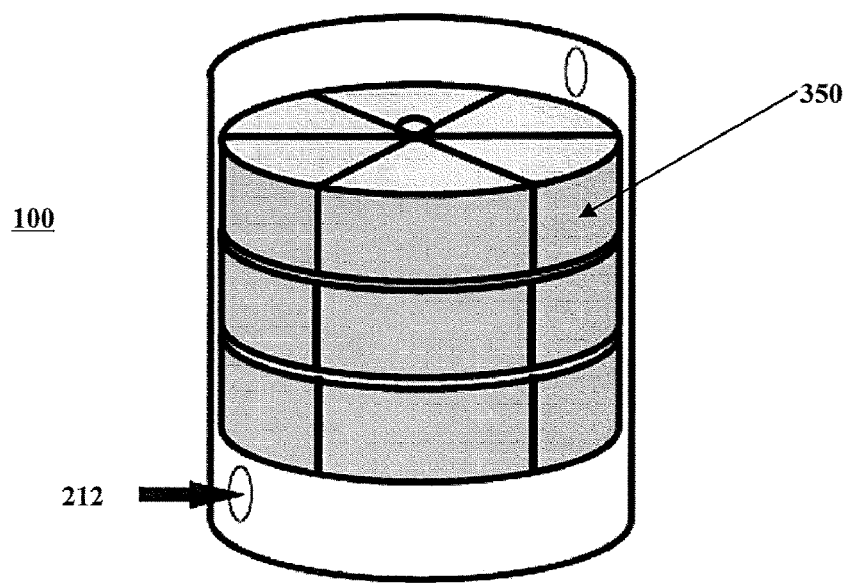
FIG. 7E is a perspective view of the treatment cell with the plurality of porous bag layers.
Figure 7F:
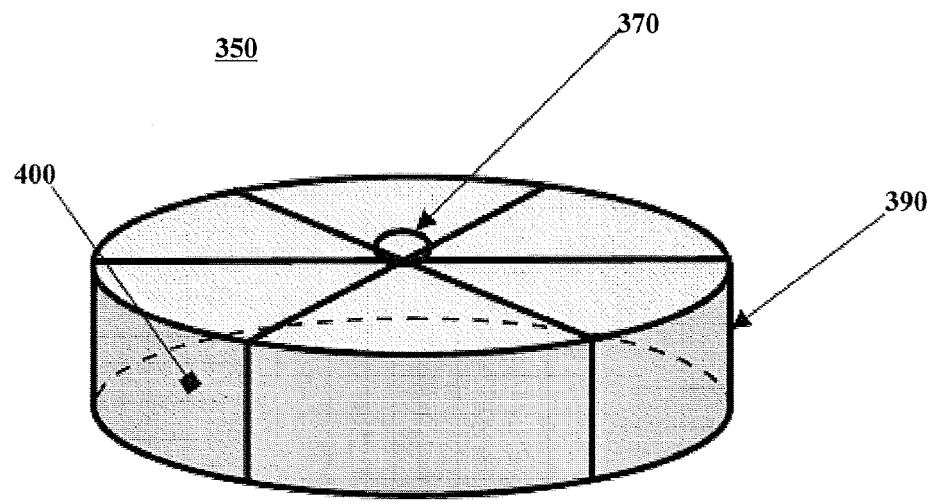

As shown in FIG. 7E, is a cut-away of treatment cell 100 with the plurality of porous bag layers 350. The porous bag layers 350 may be reinforced with straps spanning the diameter of the porous bag layers on the top and side layer. The porous bag layers 350 include the ZVIF packing 400 and are stacked upon each other to allow for replacement and removal of individual porous bag layers 350 as need be. The lift straps 370 are shown in FIG. 7F, as well as the reinforced porous bag material 390.

EXAMPLES

The following examples are put forth so as to provide those of ordinary skill in the art with a complete disclosure and description of how the processes, apparatuses, systems, and/or methods claimed herein are made and evaluated, and are intended to be purely exemplary and are not intended to limit the scope of processes, apparatuses, systems, and/or methods. Efforts have been made to ensure accuracy with respect to numbers (e.g., amounts, temperature, etc.), but some errors and deviations should be accounted for.

Example 1

Field Test

Figure 14:
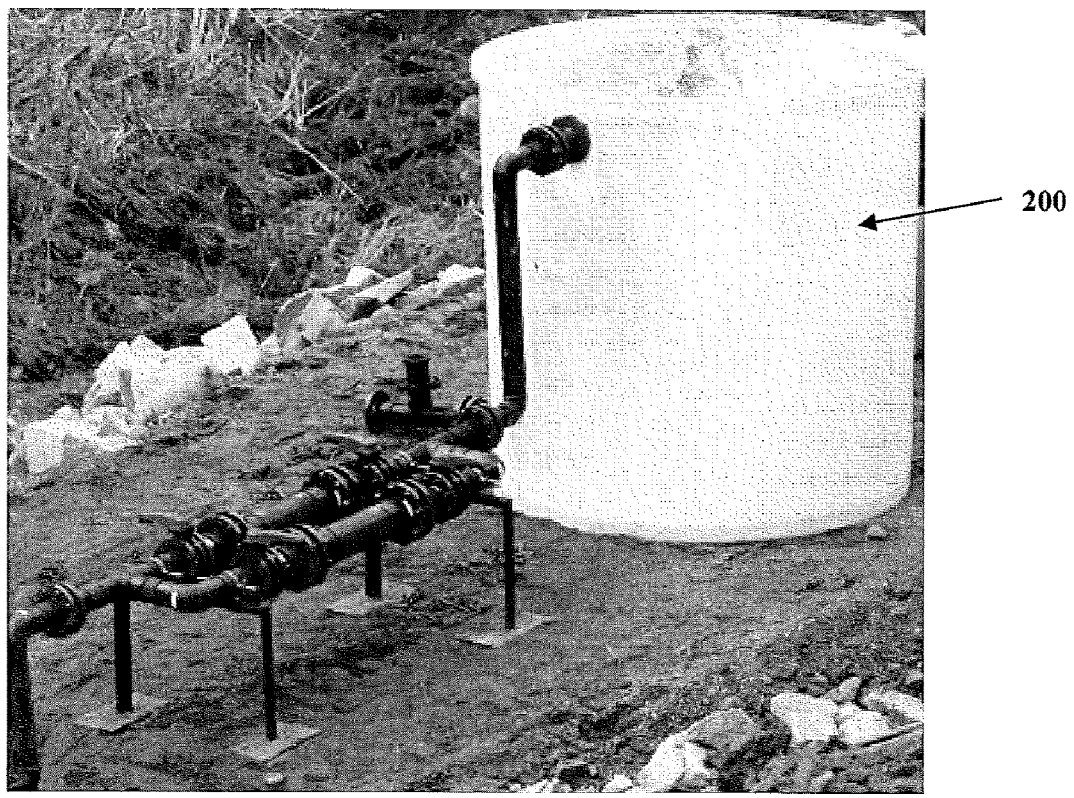
FIG. 14 is a treatment cell in a field test.

A field demonstration using ZVIF packing with a metal fiber 410 with an average fiber width of 50 μm in a nominal 1850 gallon container vessel 200 was evaluated, as shown FIG. 14. The container vessel 200 was installed at a surface mine and included a top-in inlet port. Piping was attached to divert mine drainage water from a pond into the top of the container vessel. The container vessel 200 was initially filled with 420 pounds of ZVIF packing 400.

Experimental

A container vessel 200 was installed that allowed top inflow and gravity exit of the mine water. The flow was roughly controllable by a valve at the outlet port. The container vessel 200 measured 6.8 feet in diameter and was 6.9 feet high. The container vessel 200 footprint measured 36 square feet. The ZVIF packing was loosely packed in the tank. Initially 420 pounds of ZVIF packing was loaded to a height of 5.5 feet. Over time the fill of the ZVIF packing settled and another 180 pounds was added, which filled the container vessel 200 to a height of 5.7 feet.

The inflow to and outflow from the container vessel 200 were tested approximately weekly for pH, selenium, iron, aluminum, and manganese concentrations. The contact time of the contaminated water with the ZVIF packing, or the residence time of the mine water can be roughly determined by calculating the volume in gallons of the bed, then determining the time it would take to displace that volume at the flow rate. This method suffers from inexact flow measurements over time (and deviations from perfect flow, such as channeling), but leads to residence times of from a little over one hour up to 16 hours. The great majority of the residence times were from 2.5 to 7.5 hours.

Results and Discussion

Figure 8:
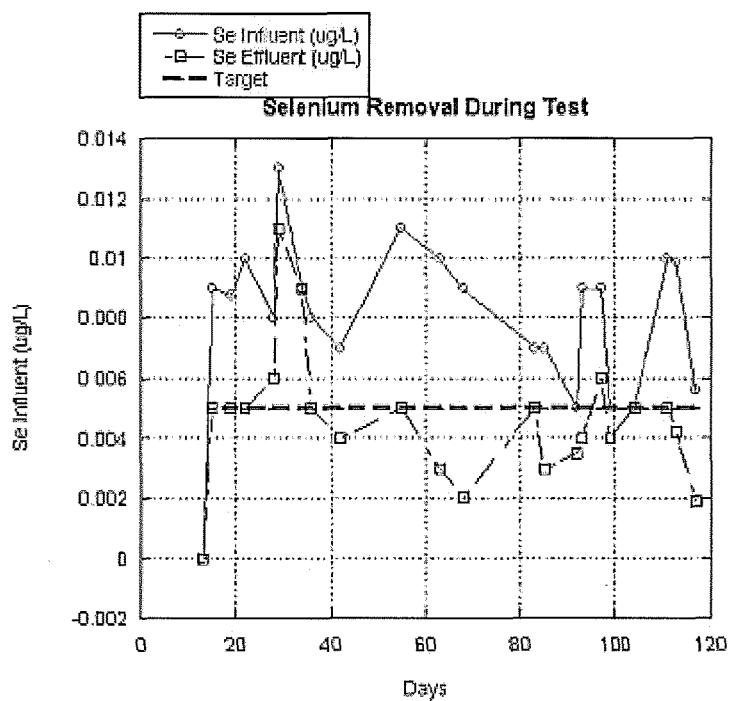
FIG. 8 is a plot of the selenium concentrations entering and leaving the treatment cell over the course of the field test.

As shown in FIG. 8, a plot of the selenium influent and effluent over time shows that in most instances, selenium is reduced below the 5 μg/L target level over a 120 day period.

Figure 9:
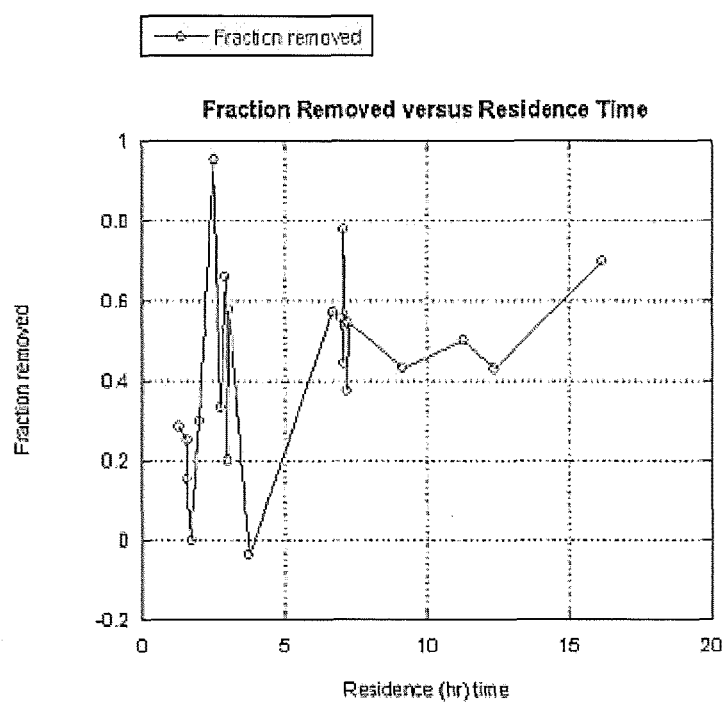
FIG. 9 is a plot of the fraction of initial Se removed as a function of residence time.

Other, more diagnostic relationships were also evaluated, notably the fraction of Se removed as a function of residence time, as shown in FIG. 9. FIG. 9 shows a general trend towards a higher fraction removed at higher residence time, but there are large fluctuations at low residence times and limitations in the chemical analyses. The conclusion that a greater than 40% of the selenium was removed from the treatment system at residence times longer than five hours is demonstrated.

Figure 10:
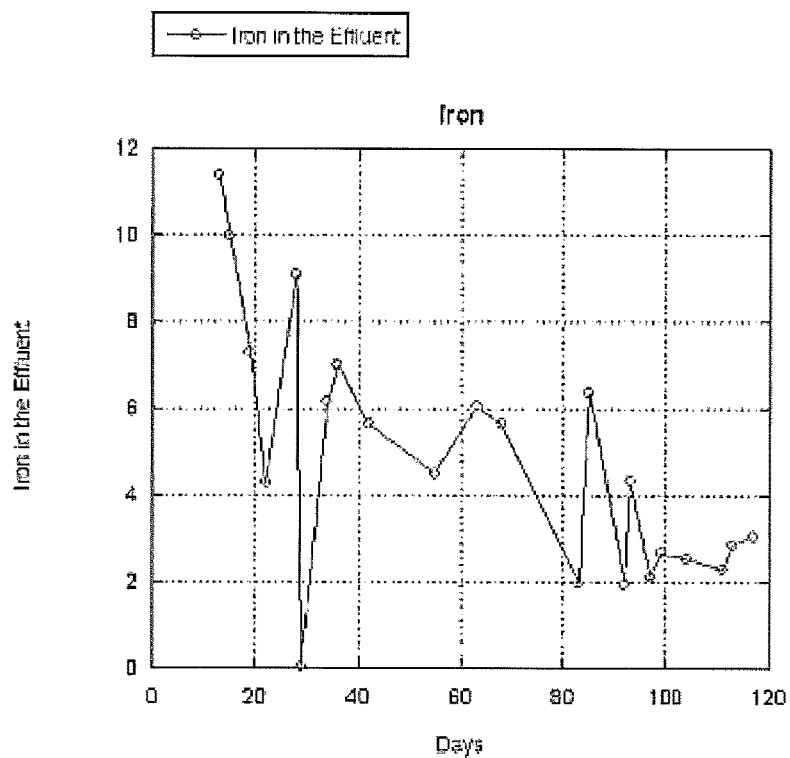
FIG. 10 is a plot of the iron removed as a function of the treatment time.

In addition to Se removal, the system released iron. Introduction of oxygen, and the actual reaction of the iron with the Se to a much lesser extent, will oxidize Fe metal to certain ferric oxides. The iron in the influent was usually immeasurable (<0.05 mg/L) but between 2 and 11 mg/L iron was in the effluent, as shown in FIG. 10. Analysis of the iron in filtered and unfiltered samples showed that all added iron was in the solid form. FIG. 10 shows a trend towards lower iron output with increasing time. This may indicate an improved inflow design or some decrease in the access of oxygen to iron, such as might occur if iron oxides coated the fiber particles.

Using the iron numbers and integrating over time shows that 47.5 pounds of the original 600 pounds of iron has been discharged. The integration is imprecise, but strongly indicates the rate of bed deterioration. The integration assumed that the flow and iron concentration were constant over the time period between measurements. The total iron loss as a result of measuring the outflow indicated that of the order of 10% of the iron is lost over a 4 month period. This is a manageable loss from the bed, and the iron discharge, since it is in solid form, can be removed by settling. No reports were given of any clogging in the system due to iron.

Figure 11:
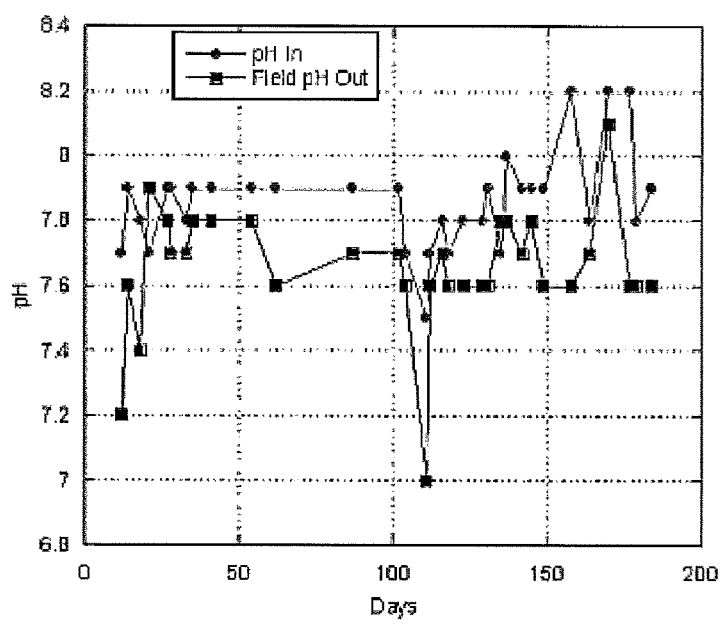
FIG. 11 is a plot of the pH of the system showing influent and effluent.

As shown in FIG. 11, a plot of the pH of the system showing influent and effluent, and drop of pH between the influent and effluent. The pH of the entry water was about 8 (which can support very little dissolved iron). The pH of the solution tends to decrease marginally, from about 8 to 7.5. The oxidation of metallic iron by oxygen, and its subsequent precipitation, produces protons that lower the pH, as in Equations (4) and (5). This is consistent with the generation of protons during the oxidation and precipitation of iron hydroxides in the bed.

Figure 12:
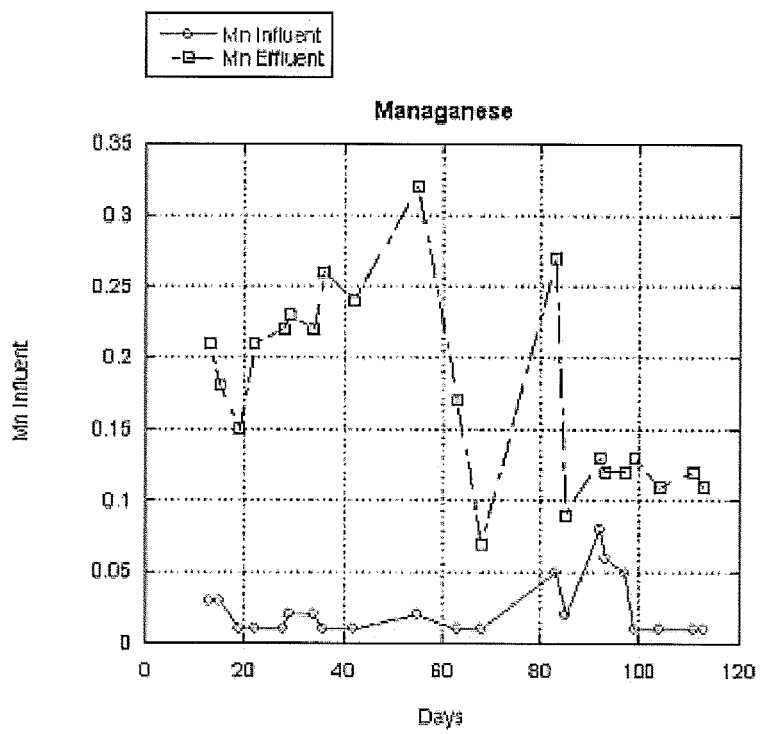
FIG. 12 is a plot of the manganese released from the bed over treatment duration.

The generation of manganese during treatment is shown in FIG. 12. The steel wool contains manganese to the level of a percent or more which oxidizes during the treatment process. The mechanism of manganese oxidation is unknown, but the amount released is roughly 1% of the amount of iron released, which is a fair indication that manganese is oxidized with iron. The amount of manganese released, as with iron, seems to decrease and stabilize over time.

Figure 13:
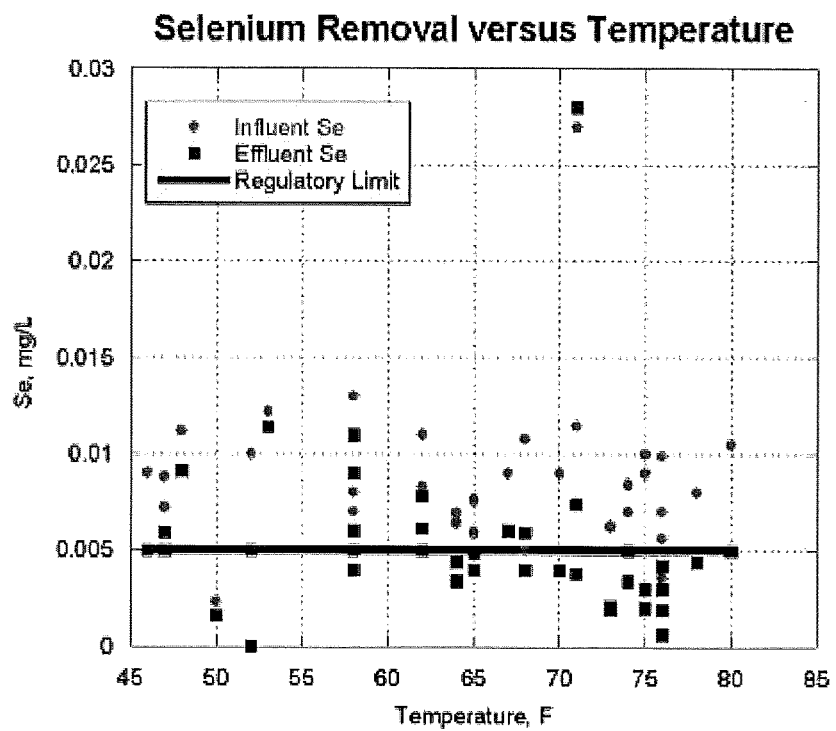
FIG. 13 is a plot of the selenium removal versus the temperature profile.

As shown in FIG. 13, a plot of the selenium removal versus the temperature profile. The plot shows rate effect of temperature on the selenium removal process.

Conclusion

The treatment test has consistently removed selenium from the incoming stream and in most instances to below 5 μg/L, despite imprecise flow control. Low flow rates and long residence times were consistently effective in removing selenium. Certain higher flow rates and shorter residence times were surprisingly effective, but selenium removal at short residence times in this test was unreliable. On occasion, some low residence times, as shown in FIG. 9, provide 50% removal rates. Treatment at 7 gallons per minute lowered the selenium content to 2 μg/L. The rate of bed deterioration is slow and manageable. The release of manganese is not substantial. Manganese, if it presents a problem, does have a known treatment chemistry, whereas selenium does not. Efforts to use low manganese source materials maybe the easiest solution. The treatment of selenium with zero-valent iron under field conditions is effective.

Example 2

Controlled Field Test

Figure 15:
FIG. 15 is a treatment cell in a field test.
Figure 16:
FIG. 16 is a treatment cell after 6 weeks of use.

Five Fifty five gallon treatment cells 100 of ZVIF packing 400 were installed in a different surface mine, as shown in FIG. 14. The five treatment cells contained a ZVIF packing 400 as follows: (1) 0.5 volume % of metal fibers 410 with a cross-section diameter d of 40 μm; (2) 1 volume % of metal fibers 410 with a cross-section diameter d of 40 μm; (3) 2 volume % of metal fibers 410 with a cross-section diameter d of 40 μm; (4) 1 volume % of metal fibers 410 with a cross-section diameter d of 60 μm; and (5) 1 volume % of metal fibers 410 with a cross-section diameter of 100 μm. A significant portion of the test involved establishing the hydraulics, so few chemical tests were plotted. At every residence time (all were near one hour) for the same fiber diameter, the higher density ZVIF packing 400 removed measurably more selenium. For the metal fibers with a cross-section diameter d of 40 microns, the 0.5 volume % treatment cell removed 11.7% of the incoming selenium at a 1.1 hour residence time. The 1 volume % treatment cell removed 25.5% at a residence time of 0.83 hour. The 2 volume % treatment cell removed 56.4% at a residence time of 2 hours. Maintaining high flow in the most densely packed treatment cell was difficult. The treatment cell packed with 1 volume % of metal fibers 410 with a cross-section diameter d of 60 μm removed 10.6% of the selenium with a residence time of 0.86 hour. The treatment cell filled with 1 volume % of metal fibers 410 with a cross-section diameter of 100 μm removed 13.8% of the selenium with a 0.86 hour residence time. No obvious fiber diameter dependence is seen for the last two treatment cells, but the 1 volume % 40 μm treatment cell removed 25.5% of the selenium as noted above. For reference, the other removal test contained 0.5 volume % of metal fibers 410 with a cross-section diameter d of 50 μm. These controlled drum tests reaffirm the removal of selenium by ZVIF and utilized the full treatment cell 100, notably use of the porous bags 300. FIG. 15 shows the fifty-five galloon treatment cell after 6 weeks of use.

Example 3

Bench Scale Evaluation of Zero-Valent Iron

The evaluation of zero-valent iron (iron metal) as a reductant for Se(IV) and Se(VI), where the product should be elemental Se(0).

The Experimental System

Figure 17:
FIG. 17 is a perspective view of the bench scale water treatment system.
Figure 18:
FIG. 18 is a vertical view of the treatment system showing the container, pump and outlet.

The system used consists of a five (5) foot length of 4 inch inside diameter Polyvinyl Chloride ("PVC") drain pipe with a 90 degree bend at both ends, as shown in FIG. 17. The exit end of the pipe also had a straight extension with a three (3) inch reduction output at 90 degrees, as shown in FIG. 18. A 120 gallon-per-hour submersible pump was used to recycle the mine drainage. The effluent was sampled and analyzed for Se and other metals at designed intervals.

Figure 19:
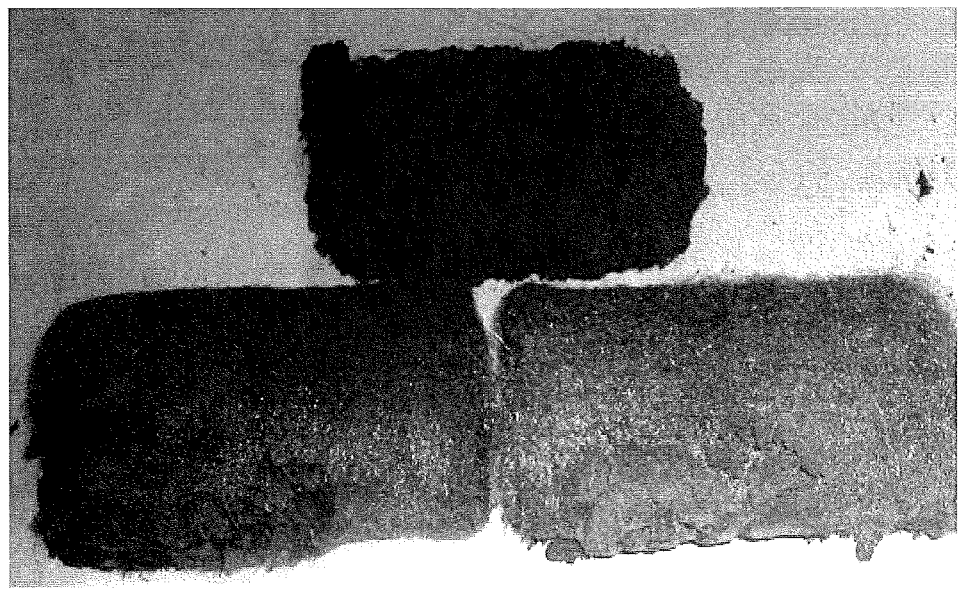
FIG. 19 is a perspective view of the ZVIF packing after the bench scale experiment.

The rate of selenium removal was 24 μg of Se/hour for the interval of 0-1 hours; 5.8 μg of Se/hour for the interval of 0-8 hours; 4.9 μg of Se/hour for the interval of 0-12 hours; and 3 μg of Se/hour for the interval of 6-12 hours. The steel wool pads after the bench test are shown in FIG. 19, where the top steel wool pad is a coarse pad and the two bottom steel wool pads are an extra fine pad.

FIG. 20 is a plot of the initial Se removal portion fit to an exponential curve for 0-6 hours. FIG. 21 is a plot of the selenium removal for 6-12 hours showing linear removal rates.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Example 4

Helical Wound Zero-Valent Iron Reel

The metal fibers 400 may include a helical wound reel configuration, wherein the helical wound reel includes layers of isotropic metal fibers helically wound about a center or core to form a helical wound reel in a cylindrical or puck-like shape. The helical wound reel may then be placed into a PVC tube in a concentric fashion, or alternatively be placed on top each other to form a fluid flow through for treating contaminated water when coupled with a water pump. The metal fibers 400 are produced in an isotropic mass as indicated previously, and then the metal fibers 400 are helically wound into a master helical roll onto a 2" diameter cardboard core. Master helical rolls are approximately about 4" wide ×24" in diameter and weigh about 20 lbs. The approximate densities of the master helical rolls are about 18 lbs per cubic foot.

The master helical roll is then taken to a reeling machine to be made into finished helical wound reels including a correct width, tension, weight and diameter. The core of the master helical roll is placed on a shaft at the beginning of the reeling machine and a 1" diameter by 10.5" long PVC core is placed in the reeling machine's bobbin. The ribbon from the master helical roll is threaded through a tensioner, a device that applies a force to an object to maintain it in tension, and hand wrapped onto the 1" PVC core. The tensioner may include a series of polls in which the ribbon may be wrapped around to apply a tension force. An operator uses a foot pedal that starts the reeling machine's bobbin to spin and helically wrap the ribbon of the master helical roll around the PVC core. The reeling machine may operate at a speed of about 50-70 rpm and the reeling machine's speed is controlled by foot pedal as an on/off function. The reeling machine includes a pressure pad on the opposite of the feed side of the reeling machine that is set to about 20-50 psi, which works with the operator to control the tension of the ribbon. The operator guides the ribbon of the master helical roll while adjusting the reeling machine's speed in order to make the helical wound reel to a particular finished specification. When the helical wound reel reaches a particular specification, the operator stops the reeling machine, cuts the helical wound reel from the master roll, and takes the finished helical wound reel off the bobbin. A 1" diameter plastic plug is placed in one end of the helical wound reel's core to eliminate fluid flow through the core. The specification for the finished helical wound reels is approximately 20 lbs, 10.5" wide ×11.5" in diameter for an approximate density of 32 pounds per cubic foot. The finished helical wound reels can be larger or smaller in diameter and width as well as higher or lower in density in order to adjust for element or selenium removal. For example, the finished helical wound reels may include a range of about 8" to 24" in diameter, 4" to 16" in length, and 15 to 50 pounds per cubic foot in density. There is no minimum or maximum pitch for the helical wound reels; however, the pitch may range from about ⅛" to ⅜".

In one example, eleven of the 20-lb finished helical reels are loaded into a 12.75" OD ×11.29" ID schedule 80 PVC tube. A complete treatment system would use several PVC tubes either in series or in parallel. Alternatively, the finished helical wound reels may be placed in any type of enclosure with a fluid flow through system, including, but not limited to a tank bale, a pipe, and the like.

What is claimed is:

1. An apparatus for removing elements from a fluid, comprising:
    a. a container vessel and a porous bag disposed within the container vessel, the container vessel including an inlet port and an outlet port to permit fluid flow through the container and exposed to the porous bag; and
    b. a plurality of metal fibers having a zero valence state, the plurality of metal fibers being packed into the porous bag at a density D sufficient to react with a plurality of elements in the fluid flow through the porous bag and the plurality of metal fibers adsorb the plurality of elements, wherein the porous bag further comprises a plurality of porous bag layers and the plurality of porous bag layers include a first porous bag layer and a second porous bag layer, wherein the first porous bag layer includes a packing of metal fibers at a first density D and the second porous bag layer includes a packing of metal fibers at a second density D, wherein the first density D is different than the second density D.

2. The apparatus of claim 1, wherein the plurality of metal fibers further comprise iron.

3. The apparatus of claim 2, wherein the plurality of iron fibers are an isotropic mass.

4. The apparatus of claim 3, wherein the mass of iron fibers further comprise an irregular cross-section and a rough outer surface with a plurality of projections and fissures formed on the rough outer surface.

5. The apparatus of claim 4, wherein the rough surface area of the mass metal fibers reduces the plurality of elements in the fluid flow.

6. The apparatus of claim 5, wherein the average cross-sectional diameter d of the metal fibers range between about 10 and 500 microns.

7. The apparatus of claim 6, wherein the plurality of elements comprises selenium ions selected from the group consisting of selenate ions and selenite ions.

8. The apparatus of claim 7, wherein the porous bag further comprises a plurality of lift straps, a porous bag wall material, and a porous bottom.

9. The apparatus of claim 1, wherein the metal fibers include a helical wound reel configuration.

10. The apparatus of claim 1, wherein the first porous bag layer includes the metal fibers comprising a first average cross-sectional diameter d and the second porous bag layer includes the metal fibers comprising a second average cross-sectional diameter d, whereby the first average cross-sectional diameter d is different than the second average cross-sectional diameter.

11. An apparatus for removing elements from a fluid, comprising:
  a. a pipe including an inlet port and an outlet port to permit fluid flow through the pipe; and
  b. a plurality of iron fibers having a zero valence state, the plurality of metal fibers being packed into a porous bag within the pipe at a density D sufficient to react with elements in the fluid flow through the porous bag, wherein the plurality of metal fibers being packed into the porous bag at a density D sufficient to react with a plurality of elements in the fluid flow through the pipe and the plurality of metal fibers adsorb the plurality of elements, wherein the porous bag further comprises a plurality of layers and the plurality of layers include a first layer and a second layer, wherein the first layer includes a packing of metal fibers at a first density D and the second layer includes a packing of metal fibers at a second density D, wherein the first density D is different than the second density D.

12. The apparatus of claim 11, wherein the plurality of iron fibers are an isotropic mass.

13. The apparatus of claim 12, wherein the isotropic mass is helically wound about a center to form a helical wound reel in a cylindrical shape.

14. An apparatus for removing elements from a fluid, comprising:
  a. a container vessel and a porous bag disposed within the container vessel, the container vessel including an inlet port and an outlet port to permit fluid flow through the container and exposed to the porous bag; and
  b. a plurality of metal fibers having a zero valence state, the plurality of metal fibers being packed into the porous bag at a density D sufficient to react with elements in the fluid flow through the porous bag, wherein the density D is within the range of about 1 lb/ft$^3$ to about 50 lb/ft$^3$, wherein the porous bag further comprises a plurality of porous bag layers, and wherein the plurality of porous bag layers include a first porous bag layer and a second porous bag layer, wherein the first porous bag layer includes a packing of metal fibers at a first density D and the second porous bag layer includes a packing of metal fibers at a second density D, wherein the first density D is different than the second density D.

15. The apparatus of claim 14, wherein the first porous bag layer includes the metal fibers comprising a first average cross-sectional diameter d and the second porous bag layer includes the metal fibers comprising a second average cross-sectional diameter d, whereby the first average cross-sectional diameter d is different than the second average cross-sectional diameter.

16. The apparatus of claim 14, wherein the plurality of metal fibers further comprise iron.

17. The apparatus of claim 16, wherein the plurality of iron fibers are an isotropic mass.

18. The apparatus of claim 17, wherein the mass of iron fibers further comprise an irregular cross-section and a rough outer surface with a plurality of projections and fissures formed on the rough outer surface.

19. The apparatus of claim 18, wherein the plurality of elements comprises selenium ions selected from the group consisting of selenate ions and selenite ions.

20. The apparatus of claim 14, wherein the metal fibers include a helical wound reel configuration.

* * * * *